(12) United States Patent
Rinner et al.

(10) Patent No.: US 8,089,197 B2
(45) Date of Patent: Jan. 3, 2012

(54) METHOD FOR OPERATING A PIEZOELECTRIC ELEMENT

(75) Inventors: Franz Rinner, Deutschlandsberg (AT); Alenko Lic, Deutschlandsberg (AT)

(73) Assignee: EPCOS AG, Munich (DE)

( * ) Notice: Subject to any disclaimer, the term of this patent is extended or adjusted under 35 U.S.C. 154(b) by 0 days.

(21) Appl. No.: 12/880,321

(22) Filed: Sep. 13, 2010

(65) Prior Publication Data
US 2011/0050037 A1 Mar. 3, 2011

Related U.S. Application Data

(63) Continuation of application No. PCT/EP2009/052864, filed on Mar. 11, 2009.

(30) Foreign Application Priority Data

Mar. 11, 2008 (DE) .......................... 10 2008 013 590

(51) Int. Cl.
*H01L 41/09* (2006.01)
*H02N 2/06* (2006.01)

(52) U.S. Cl. ........................................ 310/317; 310/328
(58) Field of Classification Search ............. 310/316.03, 310/317, 323.01–323.21, 328
See application file for complete search history.

(56) References Cited

U.S. PATENT DOCUMENTS 7,638,923 B2 12/2009 Bachmaier et al.

| | | | |
|---|---|---|---|
| 2002/0011762 A1* | 1/2002 | Klenk et al. | 310/316.03 |
| 2005/0275310 A1* | 12/2005 | Ripoll | 310/317 |
| 2006/0049716 A1* | 3/2006 | Yuasa | 310/317 |
| 2007/0030318 A1* | 2/2007 | Sato et al. | 347/68 |

FOREIGN PATENT DOCUMENTS

| | | |
|---|---|---|
| DE | 28 15 421 B1 | 9/1979 |
| DE | 199 05 340 A1 | 8/2000 |
| DE | 102 28 146 A1 | 5/2004 |
| DE | 102 50 917 B3 | 6/2004 |
| DE | 10 2004 046 079 A1 | 4/2006 |
| DE | 10 2004 046 080 A1 | 4/2006 |
| DE | 10 2005 058 301 A1 | 6/2007 |
| EP | 1 445 459 A1 | 8/2004 |
| JP | 2003-219667 A | 7/2003 |

* cited by examiner

*Primary Examiner* — Derek Rosenau
(74) *Attorney, Agent, or Firm* — Slater & Matsil, L.L.P.

(57) ABSTRACT

A method for operating a piezoelectric element is disclosed. A first voltage is applied to a piezoelectric element and produces a first deflection of the piezoelectric element with a travel. An electrical discharge of the piezoelectric element after the application of the first voltage results in a first contraction of the piezoelectric element by a first compression. After the first contraction, a second voltage is applied to the piezoelectric element, whose polarity is opposite that of the first voltage and causes a further contraction of the piezoelectric element by a second compression. Repeated application of the first voltage after the electrical discharge of the applied second voltage results in a deflection of the piezoelectric element with the same travel.

20 Claims, 3 Drawing Sheets

METHOD FOR OPERATING A PIEZOELECTRIC ELEMENT

This application is a continuation of co-pending International Application No. PCT/EP2009/052864, filed Mar. 11, 2009, which designated the United States and was not published in English, and which claims priority to German Application No. 10 2008 013 590.9, filed Mar. 11, 2008, both of which applications are incorporated herein by reference.

TECHNICAL FIELD

The invention relates to a method for operating a piezoelectric element.

BACKGROUND

The German patent document DE 60 2004 000 190 T2 discloses a method for operating a piezoelectric element.

SUMMARY

In one aspect, the present invention specifies a method which allows the travel of a piezoelectric element to be increased.

A method for operating a piezoelectric element is specified, in which a first voltage is applied to the piezoelectric element. The first voltage produces a first deflection of the piezoelectric element. The deflection of the piezoelectric element is normally referred to as the travel of a piezoelectric element.

An electrical discharge of the piezoelectric element after the application of the first voltage results in a first contraction of the piezoelectric element. The length by which the piezoelectric element contracts in this process is in this case referred to as a first compression. After the first contraction of the piezoelectric element, a second voltage is applied to the piezoelectric element. The second voltage preferably has a polarity which is opposite the polarity of the first voltage. The second voltage produces a further contraction of the piezoelectric element. The piezoelectric element in this case contracts by a second compression.

After the electrical discharge of the second applied voltage, a first voltage is applied repeatedly, which produces a deflection of the piezoelectric element. In this case, the deflection of the piezoelectric element preferably has approximately the same travel as when the first voltage was previously applied.

After the first electrical discharge of the first voltage, the piezoelectric element has a first dimension. After the electrical discharge of the second voltage, the piezoelectric element has a second dimension, wherein the second dimension is preferably less than the first dimension.

After the second contraction as a result of the applied second voltage, the piezoelectric element has a third dimension, which is less than the first dimension. The third dimension of the piezoelectric element is preferably also less than the second dimension of the piezoelectric element.

After the electrical discharge of the applied second voltage, the piezoelectric element expands by a strain wherein the piezoelectric element then once again approximately has the second dimension of the piezoelectric element.

The difference between the first dimension and the second dimension is preferably equal to the difference between the second compression, caused by the applied second voltage, and the strain after the electrical discharge of the applied second voltage.

The application of a negative voltage compresses the piezoelectric element, in which case it does not return to its previous length after the electrical discharge of the negative voltage, but remains in a compressed state. After the electrical discharge of the second voltage, the piezoelectric element therefore has a shorter length dimension than after the electrical discharge of the first voltage.

This shorter length dimension of the piezoelectric element makes it possible to increase the travel when the first voltage is next applied. The increase in the travel corresponds approximately to the difference between the second compression when the second voltage is applied and the subsequent strain resulting from the electrical discharge of the second voltage.

After the electrical discharge of the second voltage, the piezoelectric element has the second dimension again. The piezoelectric element expands by the first deflection by repeated application of the first voltage.

In one preferred embodiment, the second voltage is applied immediately after the first contraction of the piezoelectric element. However, it is also possible for the second voltage to be applied at virtually any desired time between two first voltages.

The maximum duration between the electrical discharge of the first voltage and the application of the second voltage is preferably equal to the duration of the difference between two first voltages and the duration of the second voltage.

When the application of the second voltage is repeated, the second dimension preferably has a tolerance ±5%.

The first voltage is preferably applied to the piezoelectric element for a duration of about 0.5 to 2.0 ms.

The first voltage preferably has a maximum value between 100 and 200 volts.

The values of repeatedly applied first voltages preferably differ from one another by at most 5%.

The duration of the first voltage is preferably longer than the duration of the second voltage which is applied to the piezoelectric element.

The second voltage preferably has a lower absolute maximum value than the first voltage.

The second voltage preferably has a magnitude between −5 and −75 volts.

A current pulse is preferably applied to the piezoelectric element in each case when the first voltage is applied and when the second voltage is applied.

The current pulse which accompanies the first voltage is preferably positive and is a maximum of 20 amperes.

The duration of the current pulse which accompanies the first voltage is approximately 0.1 to 0.5 ms. In one preferred embodiment, the duration of the current pulse which accompanies the first voltage is 0.25 to 0.3 ms.

The current pulse which accompanies the second voltage is preferably negative and is a maximum of −15 amperes.

The duration of the current pulse which accompanies the second voltage is approximately 0.01 to 0.2 ms. In one preferred embodiment, the duration of the current pulse which accompanies the second voltage is 20 to 100 μs.

The duration of the current pulse which accompanies the second voltage is preferably shorter than the duration of the current pulse which accompanies the first voltage.

In one embodiment, the travel is preferably in a range between 40 and 50 μm. In a further embodiment, however, it is also possible for the travel to be up to 80 μm.

In one preferred embodiment, the piezoelectric element is used in an application in which the piezoelectric element oscillates at a frequency of, for example, 50 Hz. Applications such as these occur, for example, in the case of injection nozzles in the motor-vehicle field.

The piezoelectric element used preferably comprises a stack of piezoceramic layers and electrode layers which are arranged one on top of the other.

The stated values indicate only examples of ranges. Other values can be used, and/or can be achieved, both for the first voltage, the second voltage and the corresponding current pulses, as well as for the strain and compression.

BRIEF DESCRIPTION OF THE DRAWINGS

The method described above will be explained in more detail with reference to the following figures and exemplary embodiments.

The drawings described in the following text should not be regarded as being to scale. In fact, in order to improve the illustration, individual dimensions may be increased, decreased or else illustrated in a distorted form. Elements which are the same as one another or which carry out the same functions are annotated with the same reference symbols.

Figure 1:
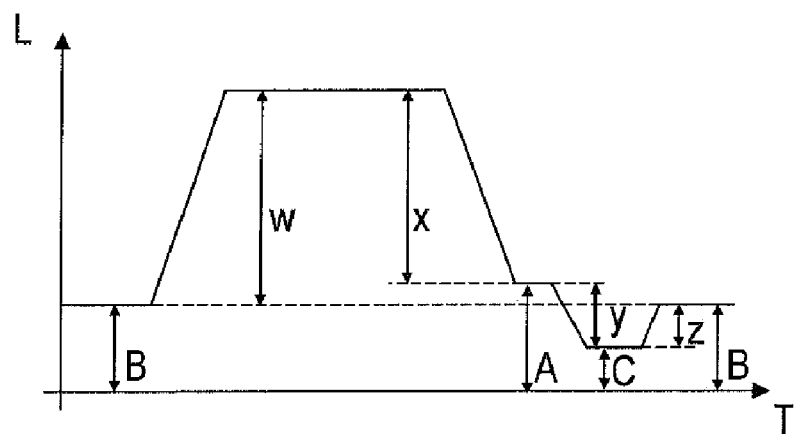
FIG. 1 shows a schematic diagram in which the length L of a piezoelectric element is plotted as a function of time T.

The following list of reference symbols can be used in conjunction with the drawings:
A First dimension of the piezoelectric element
B Second dimension of the piezoelectric element
C Third dimension of the piezoelectric element
w Travel
x First compression
y Second compression
z Strain
d Difference between the first dimension A and the second dimension B
1 First voltage
2 Second voltage
10 Line for the first trial (without the second voltage 2)
11 Line for the second trial (with the second voltage 2 of −20 volts)
12 Line for the third trial (with the second voltage 2 of −40 volts)
100 Ceramic layers
101 Electrode layers
102 Outer electrodes

DETAILED DESCRIPTION OF ILLUSTRATIVE EMBODIMENTS

FIG. 1 shows an expansion diagram of the piezoelectric element plotted over a time period. The x-axis schematically indicates time T. The y-axis schematically indicates the extent L of the piezoelectric element. At the start of the diagram, the piezoelectric element has a length B, which is referred to as the second dimension. Application of a first voltage results in the piezoelectric element expanding by a distance w. This distance w is referred to as the travel of the piezoelectric element. As long as the first voltage is applied to the piezoelectric element, the piezoelectric element remains strained. After the electrical discharge of the first voltage, the piezoelectric element contracts by a distance x. The piezoelectric element now has a first length dimension A. This dimension A is greater than the second dimension B before the application of the first voltage. After the electrical discharge of the first voltage, a second voltage is applied to the piezoelectric element. The second voltage preferably has an opposite polarity to the first voltage. The piezoelectric element contracts further by a distance y as a result of the application of the second, negative voltage. The further contraction results in the piezoelectric element now having a third length dimension C. This third dimension C is less than the first dimension A, and is likewise less than the second dimension B. After the electrical discharge of the second voltage, the piezoelectric element is strained by a distance z. After being strained through the distance z, the piezoelectric element preferably once again has the second dimension B.

Figure 2:
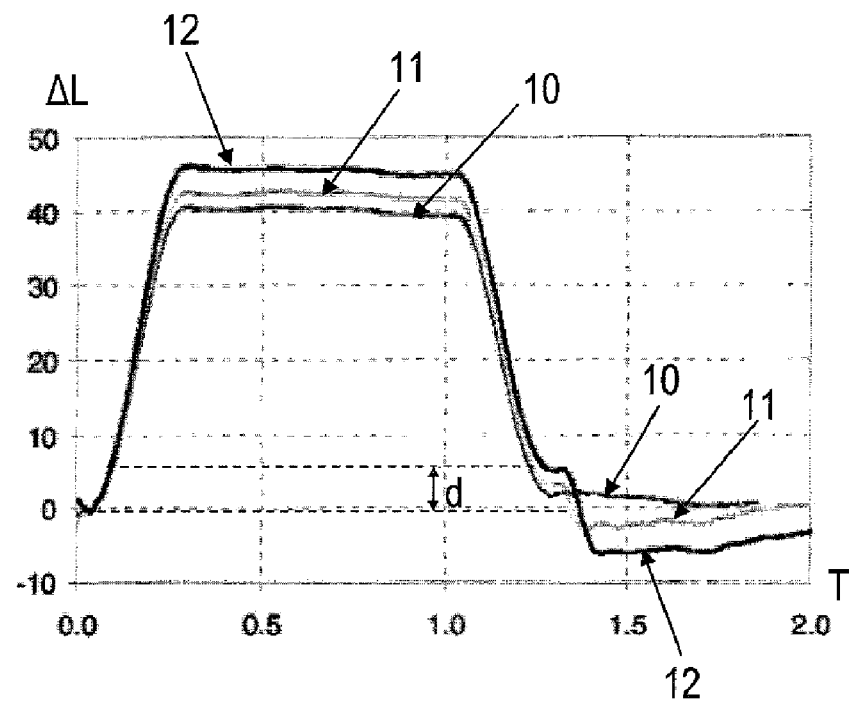
FIG. 2 shows a diagram of measurements corresponding to FIG. 1, in which the change in the length of a piezoelectric element is plotted as a function of time T, in which case the first voltage is respectively followed by no second voltage, a second voltage of −20 volts and a second voltage of −40 volts.

The dimensions A, B and C of the piezoelectric actuator are illustrated in a shortened form in FIGS. 1 and 2. The ratio between the length changes w, x, y and z is illustrated enlarged in comparison to the dimensions A, B and C.

The difference between the first dimension A and the second dimension B is preferably approximately the same as the difference between the distance y by which the piezoelectric element is compressed when the second voltage is applied, and the length z by which the piezoelectric element is strained during the electric discharge of the second voltage. The travel of the piezoelectric element is increased approximately by this difference.

The application of the second voltage, which preferably has the opposite polarity to the first voltage, results in an increase in the travel of the piezoelectric element. Without the second voltage, the piezoelectric element would have only a travel which corresponds approximately to a change in the length by the distance x by which the piezoelectric element contracts when the first voltage is electrically discharged.

The second voltage is applied between two first voltages. The piezoelectric element is preferably operated such that the piezoelectric element oscillates at a specific frequency, for example, 50 Hz. By way of example, a first voltage is for this purpose applied every 20 ms, in response to which the piezoelectric element increases its length. The second voltage is applied between two first voltages, in which case the interval between the electrical discharge of the first voltage and the application of the second voltage is at most the difference between the duration between two first voltages 1 and the length of the second voltage.

FIG. 2 shows the profile of the change in length of the piezoelectric element over time T. In this case, the x axis on the diagram shows the time profile in ms (milliseconds).

The change in length ΔL of the piezoelectric actuator is plotted in μm (micrometers) on the y-axis. The diagram shows three measurements, which are represented by three lines 10, 11, 12.

The profile which is represented by the line 10 indicates the profile of the change in length of a piezoelectric element when a first voltage was applied. The piezoelectric element is strained by about 40 μm when the first voltage is applied. After the electrical discharge of the first voltage, the piezoelectric element contracts again after about 1.0 ms to its original length. During this trial, no further second voltage was applied after the first voltage. The strain of the piezoelectric element remains at the same length until the next first voltage is applied.

The profile of the line 11 illustrates the change in length of a piezoelectric element in which the electrical discharge of the first voltage is followed by a second, negative voltage. The second voltage has a voltage of −20 volts for the trial represented by the line 11. After being strained to about 43 μm over about 1.0 ms, the piezoelectric element contracts after the electrical discharge of the first voltage back to a first dimension, which is greater by the difference d than the second dimension at the start of the measurement. The second, negative voltage of −20 volts is then applied to the piezoelectric element. The second voltage results in the piezoelectric element contracting further. The compression is in this case about 6 μm. After the electrical discharge of the second voltage, the piezoelectric element is strained again to the second dimension. The second dimension preferably has a length which is shorter by the difference d than the first dimension.

In the third trial illustrated in FIG. 2, which is sketched by the line 12, a second, negative voltage is applied after the first voltage. The second voltage has a value of −40 volts. In comparison to the profile of the line 11, the piezoelectric element therefore has a greater travel when the first voltage is applied. The maximum strain is in this case about 46 μm. The compression when the second, negative voltage is applied is about 10 μm.

Figure 3:
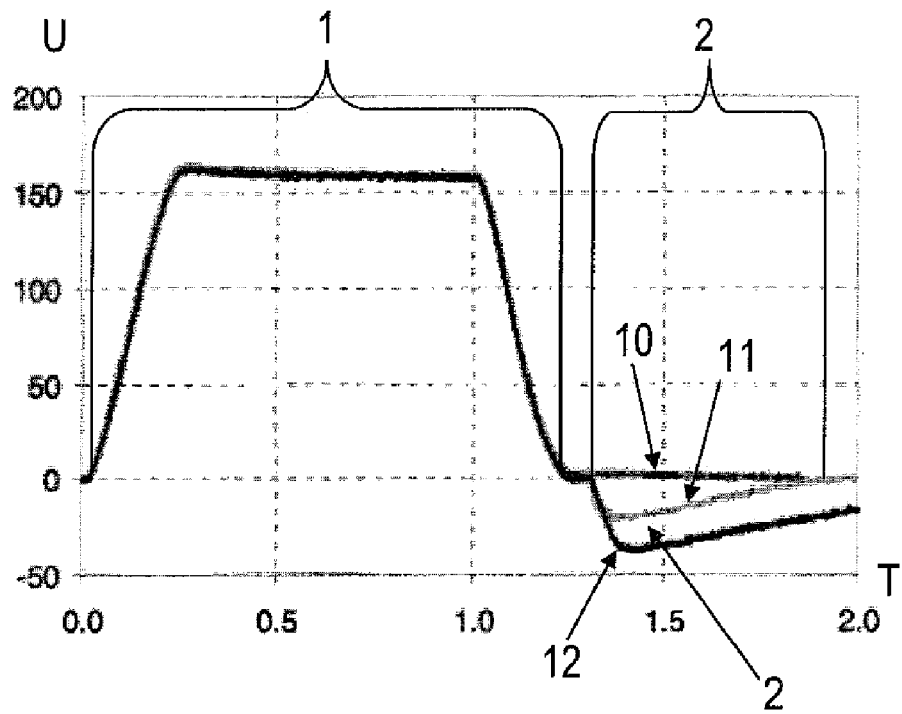
FIG. 3 shows the diagram associated with FIG. 2, in which voltage U is plotted as a function of time T.
Figure 4:
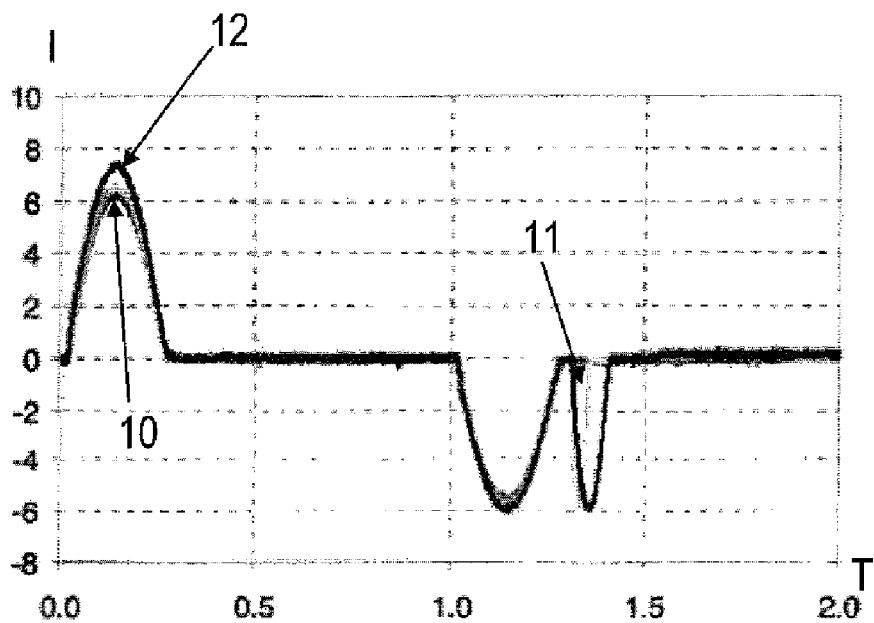
FIG. 4 shows the diagram associated with FIG. 2 and FIG. 3, in which the current level I is plotted as a function of time T.

The voltage/time diagram, and current/time diagram, which are analogous to FIG. 2, are illustrated in FIGS. 3 and 4.

FIG. 3 shows a diagram which illustrates the profile of the voltage, based on the profile illustrated in FIG. 2, of the change in length of a piezoelectric element over time T. The time T is plotted in ms on the x-axis, and the voltage U in volts on the y-axis. After application of a first voltage 1 to a piezoelectric element, no further second voltage 2 is then applied in a first trial (line 10). A second, negative voltage 2 of −20 volts (line 11) and −40 volts (line 12) is applied after the first voltage 1 in a second trial (line 11) and a third trial (line 12). In all three trials (10, 11, 12), the maximum of the first voltage 1 is about 160 volts.

In this case, the travel of the piezoelectric element increases without any increase in the first voltage 1 to be applied. With the same applied first voltage 1, the travel of the piezoelectric element can be increased by applying a second, negative voltage 2 in between.

As is illustrated in FIG. 3, the second voltage 2 can be applied immediately after the first voltage 1. However, it is also possible for there to be a greater time period between the first voltage 1 and the second voltage 2. The maximum interval between the first voltage 1 and the second voltage 2 is the difference in the time interval between two successive first voltages 1 and the duration of the second voltage 2.

FIG. 4 shows a diagram illustrating the current profile over time T, corresponding to FIGS. 2 and 3. The x-axis shows the time profile in ms, and the current level I is plotted in amperes on the y-axis. When a first voltage 1 is applied, the current drawn increases for about 0.3 ms to a maximum of 8 amperes (line 12) or 6 amperes (line 10). After the electrical discharge of the first voltage 1 after about 1.0 ms, the current flow is about −6 amperes. When the negative, second voltage is applied a current of about −6 amperes flows over about 0.05 ms (line 11) or 0.1 ms (line 12).

The increase in the travel of the piezoelectric element results in an increase in the current drawn.

Figure 5:
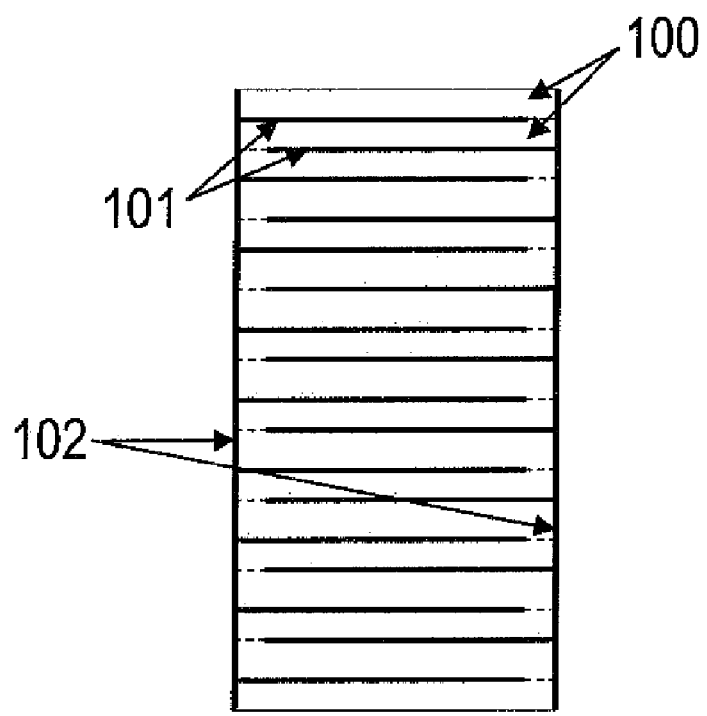
FIG. 5 shows a schematic design of a piezoelectric actuator.

FIG. 5 shows a schematic sketch of a piezoelectric actuator. The piezoelectric element has ceramic layers 100. The ceramic layers 100 have electrode layers 101, in which case the electrode layers 101 make alternate contact with the outside via a first and a second outer electrode 102. Application of a voltage to the outer electrodes 102 of the piezoelectric element results in the piezoelectric element length contracting or straining. The difference between the original length of the piezoelectric element and the length in the strained state is referred to as the travel of the piezoelectric element.

The piezoelectric actuator used in FIGS. 2 to 4 is a piezoelectric actuator of the PPD type, which was operated in freewheeling form with a tubular spring at a frequency of 50 Hz. The described method for operating a piezoelectric element is, however, also suitable for any other desired types of piezoelectric actuators and for virtually any other desired frequencies.

Although it has been possible to describe only a limited number of possible developments of the invention in the exemplary embodiments, the invention is not restricted to these. In principle, it is possible for the piezoelectric element to be operated at virtually any desired frequency, or for the second voltage to have a greater negative value.

The invention is not restricted to the number of elements illustrated.

The description of the objects referred to here is not restricted to the individual specific embodiments, and in fact the features of the individual embodiments can be combined with one another as required, where technically worthwhile.

What is claimed is:

1. A method for operating a piezoelectric element, the method comprising:
    applying a first voltage to the piezoelectric element to produce a first deflection of the piezoelectric element with a travel, wherein an electrical discharge of the piezoelectric element after applying the first voltage results in a first contraction of the piezoelectric element;
    after the first contraction, applying a second voltage to the piezoelectric element to cause a further contraction of the piezoelectric element, the second voltage having a polarity opposite that of the first voltage; and
    re-applying the first voltage after electrical discharge of the applied second voltage, wherein a deflection of the piezoelectric element has the same travel;
    wherein the piezoelectric element has a first dimension after the electrical discharge of the first voltage, and has a smaller second dimension after the electrical discharge of the second voltage;
    wherein the piezoelectric element has a third dimension after the further contraction, the third dimension being less than the first dimension and the second dimension; and
    wherein the second voltage has a lower absolute maximum value than the first voltage.

2. The method as claimed in claim 1, further comprising re-applying the second voltage such that the second dimension has a tolerance ±5%.

3. The method as claimed in claim 1, wherein the piezoelectric element expands to the second dimension after the electrical discharge of the applied second voltage.

4. The method as claimed in claim 1, wherein the second voltage is applied immediately after the first contraction of the piezoelectric element.

5. The method as claimed in claim 1, wherein the first voltage has a maximum value of between 100 V and 200 V.

6. The method as claimed in claim 1, wherein applying the first voltage and re-applying the first voltage are performed such that values of the first voltages differ from one another by at most 5%.

7. A method for operating a piezoelectric element, the method comprising:
    applying a first voltage to the piezoelectric element to produce a first deflection of the piezoelectric element with a travel, wherein an electrical discharge of the piezoelectric element after applying the first voltage results in a first contraction of the piezoelectric element;

after the first contraction, applying a second voltage to the piezoelectric element to cause a further contraction of the piezoelectric element, the second voltage having a polarity opposite that of the first voltage; and re-applying the first voltage after electrical discharge of the applied second voltage, wherein a deflection of the piezoelectric element has the same travel;

wherein the piezoelectric element has a first dimension after the electrical discharge of the first voltage, and has a smaller second dimension after the electrical discharge of the second voltage;

wherein the piezoelectric element has a third dimension after the further contraction, the third dimension being less than the first dimension and the second dimension; and wherein applying the first voltage comprises applying the first voltage to the piezoelectric element for longer than a duration of the applying the second voltage.

8. The method as claimed in claim 1, wherein the second voltage is in a range between −5 V and −75 V.

9. The method as claimed in claim 1, wherein a maximum duration between removing the first voltage and applying the second voltage is equal to the difference between the duration between applying the first voltage and re-applying the first voltage and the duration between applying the second voltage and removing the second voltage.

10. The method as claimed in claim 1, further comprising applying a first current pulse to the piezoelectric element when the first voltage is applied and applying a second current pulse to the piezoelectric element when the second voltage is applied.

11. The method as claimed in claim 10, wherein the first current pulse is positive and is a maximum of 20 A.

12. The method as claimed in claim 10, wherein the second current pulse is negative and is a maximum of −15 A.

13. The method as claimed in claim 1, wherein the piezoelectric element comprises a stack of piezoceramic layers and electrode layers arranged one on top of the other.

14. A method for operating a piezoelectric element, the method comprising:
 applying a first voltage to the piezoelectric element to produce a first deflection of the piezoelectric element with a travel, wherein an electrical discharge of the piezoelectric element after applying the first voltage results in a first contraction of the piezoelectric element, wherein applying the first voltage comprises applying the first voltage to the piezoelectric element for a duration of 0.5 to 2 ms;
 after the first contraction, applying a second voltage to the piezoelectric element to cause a further contraction of the piezoelectric element, the second voltage having a polarity opposite that of the first voltage; and
 re-applying the first voltage after electrical discharge of the applied second voltage, wherein a deflection of the piezoelectric element has the same travel.

15. The method as claimed in claim 14, wherein the piezoelectric element has a first dimension after the electrical discharge of the first voltage, and has a smaller second dimension after the electrical discharge of the second voltage.

16. The method as claimed in claim 15, wherein the piezoelectric element has a third dimension after the further contraction, the third dimension being less than the first dimension and the second dimension.

17. A method for operating a piezoelectric element, the method comprising:
 applying a first voltage to the piezoelectric element to produce a first deflection of the piezoelectric element with a travel, wherein an electrical discharge of the piezoelectric element after applying the first voltage results in a first contraction of the piezoelectric element;
 after the first contraction, applying a second voltage to the piezoelectric element to cause a further contraction of the piezoelectric element, the second voltage having a polarity opposite that of the first voltage; and
 re-applying the first voltage after electrical discharge of the applied second voltage, wherein a deflection of the piezoelectric element has the same travel;
 wherein the method further comprises applying a first current pulse to the piezoelectric element when the first voltage is applied and applying a second current pulse to the piezoelectric element when the second voltage is applied, wherein the first current pulse is positive and is a maximum of 20 A and wherein the first current pulse has a duration of approximately 0.2 to 0.5 ms.

18. A method for operating a piezoelectric element, the method comprising:
 applying a first voltage to the piezoelectric element to produce a first deflection of the piezoelectric element with a travel, wherein an electrical discharge of the piezoelectric element after applying the first voltage results in a first contraction of the piezoelectric element;
 after the first contraction, applying a second voltage to the piezoelectric element to cause a further contraction of the piezoelectric element, the second voltage having a polarity opposite that of the first voltage; and
 re-applying the first voltage after electrical discharge of the applied second voltage, wherein a deflection of the piezoelectric element has the same travel;
 wherein the method further comprises applying a first current pulse to the piezoelectric element when the first voltage is applied and applying a second current pulse to the piezoelectric element when the second voltage is applied, wherein the second current pulse is negative and is a maximum of −15 A and wherein the second current pulse has a duration of approximately 0.01 to 0.1 ms.

19. A method for operating a piezoelectric element, the method comprising:
 applying a first voltage to the piezoelectric element to produce a first deflection of the piezoelectric element with a travel, wherein the travel is in a range between 40 and 80 µm and wherein an electrical discharge of the piezoelectric element after applying the first voltage results in a first contraction of the piezoelectric element;
 after the first contraction, applying a second voltage to the piezoelectric element to cause a further contraction of the piezoelectric element, the second voltage having a polarity opposite that of the first voltage; and
 re-applying the first voltage after electrical discharge of the applied second voltage, wherein a deflection of the piezoelectric element has the same travel.

20. The method as claimed in claim 19, wherein the piezoelectric element has a first dimension after the electrical discharge of the first voltage, and has a smaller second dimension after the electrical discharge of the second voltage, and wherein the piezoelectric element has a third dimension after the further contraction, the third dimension being less than the first dimension and the second dimension.

* * * * *